United States Patent
Ikeda et al.

[11] Patent Number: 6,045,181
[45] Date of Patent: Apr. 4, 2000

[54] ADJUSTABLE HEADREST

[75] Inventors: Noriyuki Ikeda; Moriyuki Eguchi, both of Kanagawa-ken, Japan

[73] Assignee: Ikeda Bussan Co., Ltd., Ayase, Japan

[21] Appl. No.: 09/270,741

[22] Filed: Mar. 16, 1999

[30] Foreign Application Priority Data

Mar. 18, 1998 [JP] Japan .................................. 10-089394

[51] Int. Cl.[7] .................................................. B60N 2/48
[52] U.S. Cl. ..................................... 297/216.12; 297/408
[58] Field of Search .................................. 297/391, 408, 297/403, 410, 216.12

[56] References Cited

U.S. PATENT DOCUMENTS

| 4,674,792 | 6/1987 | Tamura et al. | 297/408 |
| 4,674,797 | 6/1987 | Tafeyama | 297/408 |
| 5,642,918 | 7/1997 | Sakamoto et al. | 297/408 |
| 5,738,412 | 4/1998 | Aufrere et al. | 297/408 |

FOREIGN PATENT DOCUMENTS

| 2264904 | 8/1975 | Germany | 297/216.12 |
| 3131633 | 2/1983 | Germany | 297/216.12 |
| 2316862 | 11/1998 | United Kingdom. | |

*Primary Examiner*—Peter R. Brown
*Attorney, Agent, or Firm*—Nath & Associates; Gary M. Nath; Harold L. Novick

[57] ABSTRACT

An adjustable headrest is provided having a main body for supporting the head of the user, a ratchet mechanism within the main body, and a frame rotatably supported on a stay member. The ratchet mechanism includes a base plate fixed to the frame, a ratchet plate with a pawl portion, a support pin connecting the reinforcing plate and the ratchet plate, and a lock member fixed to the frame. The base plate has a receiving hole into which the support pin is inserted. A slit having a width smaller than the outside diameter of the support pin is formed in the base plate and extends backward from the receiving hole such that, when the headrest receives an impact in the backward direction, the support pin moves in the slit while widening the width of the slit under pressure. The resulting backward movement of the pin and the deformation of the slit absorbs the impact.

7 Claims, 7 Drawing Sheets

ADJUSTABLE HEADREST

BACKGROUND OF THE INVENTION

The present invention relates to an adjustable headrest to be provided to a vehicle seat.

A conventional adjustable headrest of this kind comprises a headrest stay extending upward from a seat back of a vehicle seat, a main body of the headrest for supporting the head portion of the occupant on the seat from the rear, and a ratchet mechanism arranged in the main body of the headrest. The main body of the headrest includes a frame rotatably connected to the headrest stay and a foamed body for covering the frame. The ratchet mechanism includes a base plate fixed to the frame, a ratchet plate with a pawl portion, and a support pin connecting a reinforcing plate and the ratchet plate, and a lock member fixed to the frame. The lock member has lock teeth which can freely be engageable with the pawl portion in different positions. The inclination of the main body of the headrest to the headrest stay is changed according to the engagement positions of the pawl portion and the lock teeth. The engagement between the pawl portion and the lock teeth prevents the main body of the headrest from inclining backward relative to the headrest stay.

SUMMARY OF THE INVENTION

When the head portion of the occupant is instantly pressed backward intensely at a time of collision of a vehicle, the main body of the headrest prevents the movement in the backward direction of the head portion to protect the head portion. At this moment, the movement of the main body of the headrest is completely prevented by the engagement between the pawl portion and the lock teeth, and therefore, the repulsion (impact) from the main body of the headrest may intensely act on the head portion.

However, in the conventional structure, the impact acting on the head portion from the main body of the headrest is absorbed by depending on only the deformation of the foamed body of the main body of the headrest. Accordingly, in order to sufficiently buffer the impact on the head portion, it is required to form the foamed body thick, and the degree of freedom of the design of the main body of the headrest may be injured.

It is an object of the present invention to provide an adjustable headrest which can sufficiently absorb the impact on the head portion, without injuring the degree of freedom of the design of the main body of the headrest.

In order to achieve the object, the adjustable headrest of the present invention comprises a stay member extending upward from the seat back of the vehicle seat, a main body for supporting the head portion of the occupant on the seat from the rear, a ratchet mechanism arranged in the main body, and an impact absorbing slit. The main body includes a frame rotatably connected to the stay member. The ratchet mechanism includes a base plate fixed to the frame, a ratchet plate with a pawl portion, a support pin connecting the reinforcing plate and the ratchet plate, and a lock member fixed to the frame. The base plate has a receiving hole into which the support pin is inserted. The lock member has lock teeth which can freely be engageable with the pawl portion in different positions. The inclination of the main body to the stay member is changed according to the engagement positions between the pawl portion and the lock teeth. The engagement between the pawl portion and the lock teeth prevents the main body from inclining backward relative to the stay member. The slit is formed in the base plate, and has a width smaller than the outside diameter of the support pin, and extends backward from the receiving hole. When the head portion receives an impact in the backward direction and the main body is intensely pressed backward, the support pin moves in the slit while widening the width with pressure, and the main body moves backward. The deformation of the slit accompanied with the movement of the support pin absorbs the impact.

According to the arrangement, when the head portion of the occupant is instantly intensely pressed backward at a time of collision of the vehicle or the like, the head portion presses the main body intensely backward. At this moment, while the engagement between the pawl portion and the lock teeth is kept, the support pin moves in the slit while widening the width of the slit with pressure, and the deformation of the slit accompanied with the movement of the support pin absorbs the impact. Furthermore, the main body moves backward, so that the repulsion added to the head portion from the main body may be reduced.

Accordingly, the impact on the head portion is sufficiently buffered without injuring the degree of freedom of the design of the main body.

DESCRIPTION OF THE PREFERRED EMBODIMENTS

A first embodiment of the present invention will be described below on the basis of the drawings. By the way, in the following description, the front direction of an occupant on a seat is the forward direction, and the backward direction thereof is the backward direction.

Figure 1:
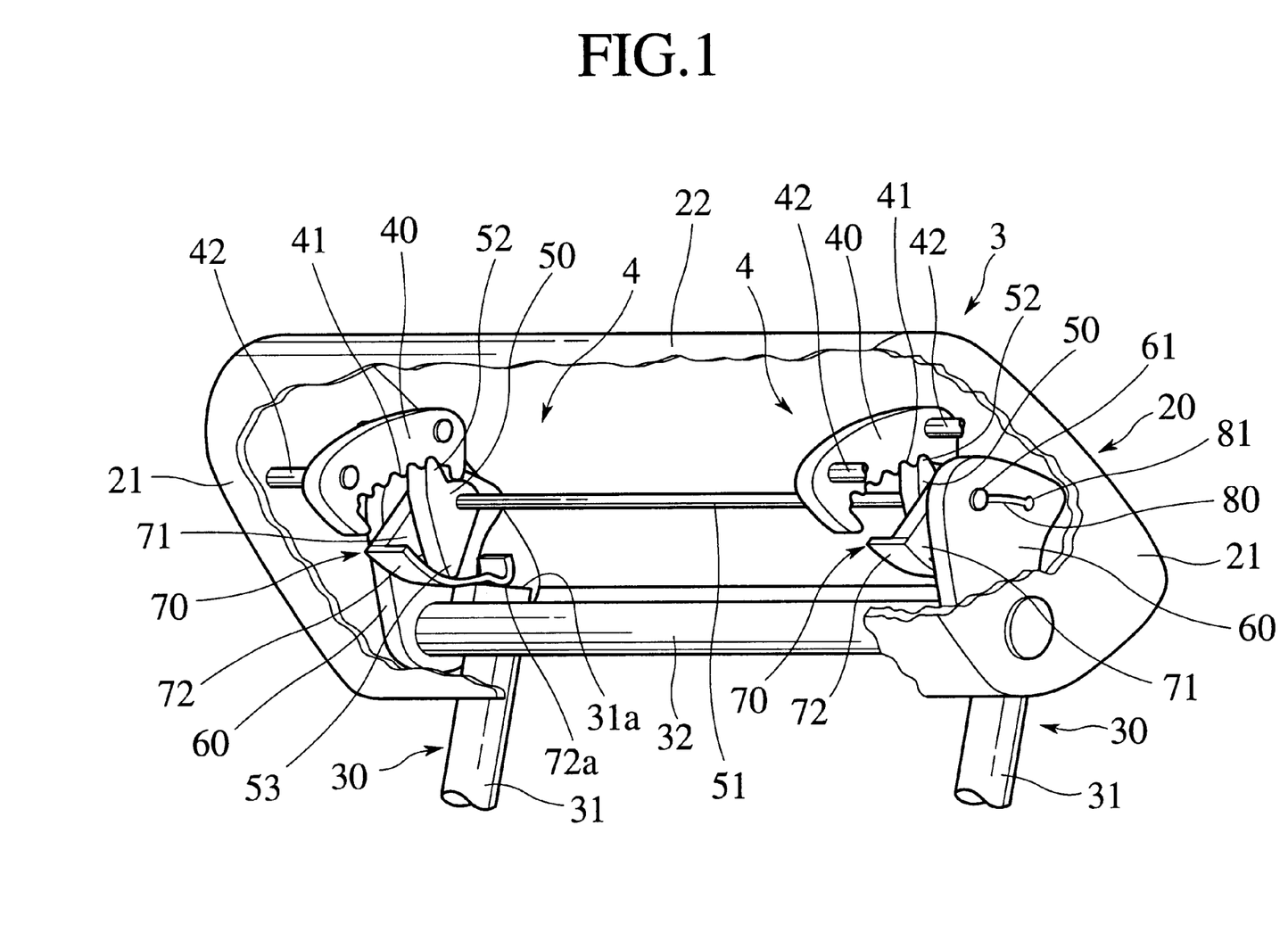
FIG. 1 is a partially exploded perspective view showing the inside of a headrest of a first embodiment of the present invention.
Figure 2:
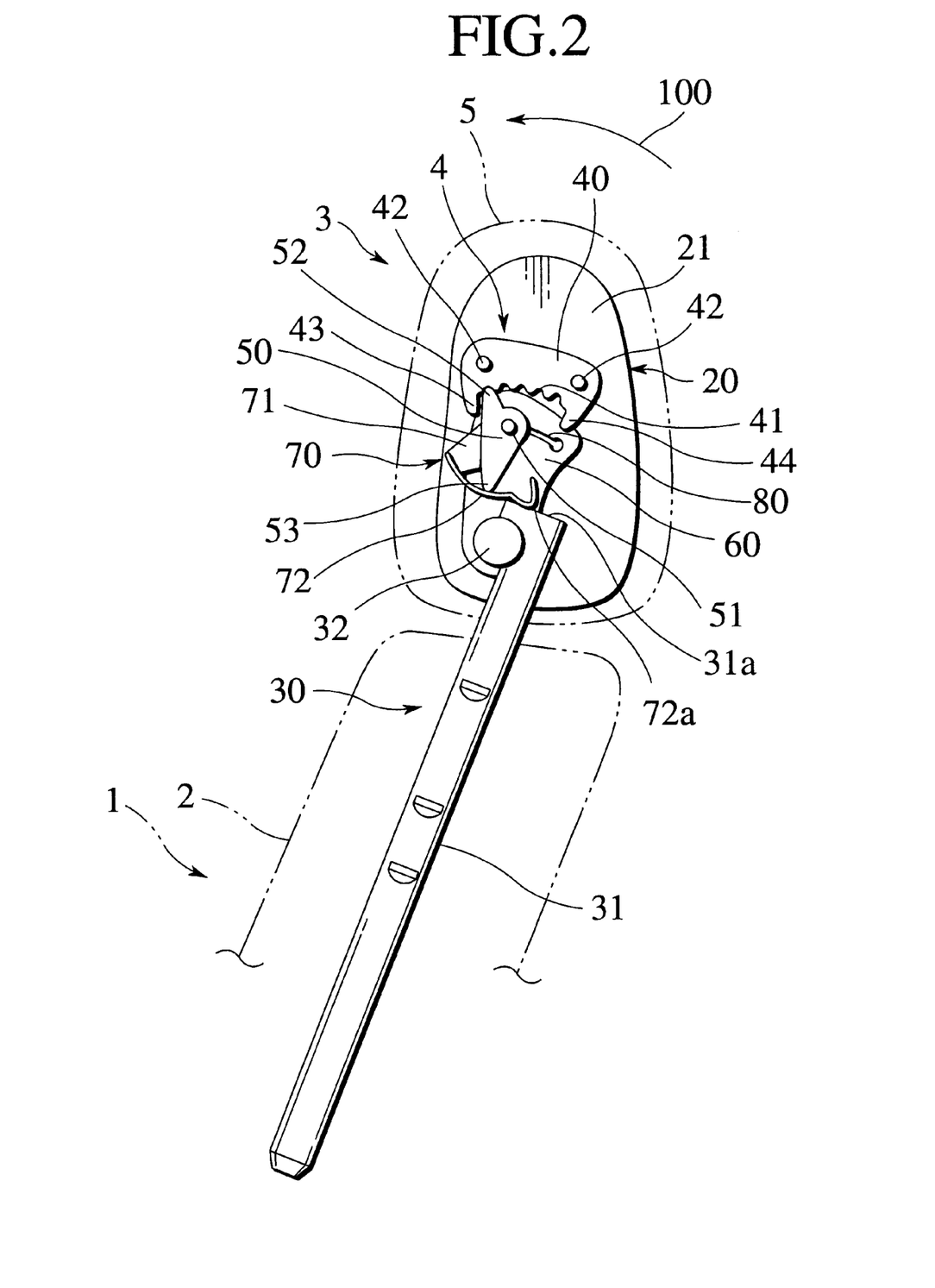
FIG. 2 is a side sectional view of the headrest of FIG. 1 in a service state where a main body is inclined to the rearmost position.

As shown in FIGS. 1 and 2, an adjustable headrest 10 of the present embodiment comprises a stay member 30, a main body 3 of the headrest, and a pair of ratchet mechanisms 4. The stay member 30 includes two leg portions 31, and a horizontal support portion 32 which is fixed to an upper ends of the leg portions 31 to connect the leg portions 31. The leg portion 31 is inserted into an unillustrated insertion hole which is open in an upper end surface of a seat back 2 of a vehicle seat 1. The leg portion 31 is fixed to the seat back 2 so that the vertical position of the main body 3 relative to the seat back 2 can be changed step by step.

The main body 3 includes a frame 20 and a pad member 5. The pad member 5 is formed from an expandable synthetic resin such as urethane, and supports the head portion of the occupant on the seat 1 from the rear. The outer surface of the pad member 5 is covered with an unillustrated outer skin member.

The frame 20 includes a pair of opposite side walls 21, and a connecting wall 22 which connects the side walls 21 and defines a space in the frame 20. The side walls 21 are rotatably connected to both ends of the horizontal support portion 32.

The ratchet mechanisms 4 are arranged in the frame 20. Each ratchet mechanism 4 includes a base plate 60, a ratchet plate 50, a lock member 40, and a spring member 70.

The base plates or members 60 are respectively fixed to both end portions of the horizontal support portion 32. Furthermore, the base members 60 are connected by a support pin 51. The support pin 51 is fixed to the base members 60. In each ratchet mechanism 4, the support pin 51 rotatably connects the reinforcing plate 60 (base plate 60 ?) and the ratchet plate 50. The ratchet plate 50 has a pawl portion 52 with a sharpened tip at the upper end thereof. The lower end sharpened 53 of the ratchet plate 50 is shaped approximately like a triangle. Each lock member 40 is fixed to the side wall 21 with a fixing pin 42. Each lock member 40 has lock teeth 41 with a plurality of grooves capable of being freely engageable with the pawl portion 52 in different positions. The grooves of the lock teeth 41 are open in the downward direction and are formed by a given pitch along the back and forth direction. The inclination of the main body 3 (frame 20) to the horizontal support member 32 is changed according to the engagement position between the pawl portion 52 and the lock teeth 41. To both ends of the lock member 40, a front end projection 43 and a rear end projection 44 projecting downward from the lock teeth 41 are provided.

The spring member 70 comprises a base portion 71 fixed to the support pin 51 and a plate spring 72 extending from the lower end of the base portion 71. The base end (lower end of the base portion 71) of the plate spring 72 is kept at a constant position relative to the horizontal support member 32. The plate spring 72 has a hook-like tip portion 72a. In the state where the pawl portion 52 is engageable with the lock teeth 41, the tip portion 72a of the plate spring 72 contacts with the upper end surface 31a of the leg portion 31, and the lower end portion 53 of the ratchet plate 50 contacts with the upper surface of the plate spring 72. In the state where the pawl portion 52 is engageable with the lock teeth 41, the plate spring 72 biases the ratchet plate 50 in the direction (upward in the figure) of increasing the engagement force of the pawl portion 52 to the lock teeth 41, so that the rotation of the ratchet plate 50 in the direction of allowing the main body 3 to incline backward (direction in which the lower end portion 53 of the ratchet plate 50 moves forward), may be prevented.

Each base plate 60 has a receiving hole 61 into which the support pin 51 is inserted, and an impact absorbing slit 80. The slit 80 has a width smaller than the outside diameter of the support pin 51, and extends backward from the receiving hole 61. The rear end 81 of the slit 80 is approximately shaped like a circular hole having an inside diameter larger than the width of the slit 80.

As shown in FIG. 2, in a service state where the main body 3 is inclined to the rearmost position, the pawl portion 52 is engageable with the foremost groove of the lock teeth 41. When it is attempted to incline the main body 3 is forced to incline further backward from this state, the lower end portion 53 of the ratchet plate 50 is forced to move forward. However, the movement in the forward direction of the lower end portion 53 is prevented by the plate spring 72, and therefore, it does not occur for the main body 3 to incline further backward.

Figure 3:
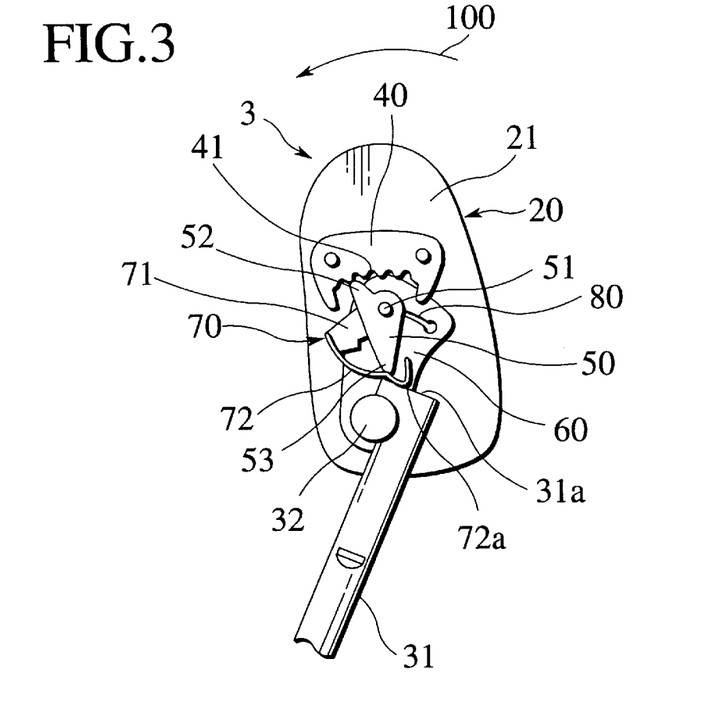
FIG. 3 is a side sectional view of the headrest in the state where the main body is inclined forward from the state of FIG. 2.
Figure 4:
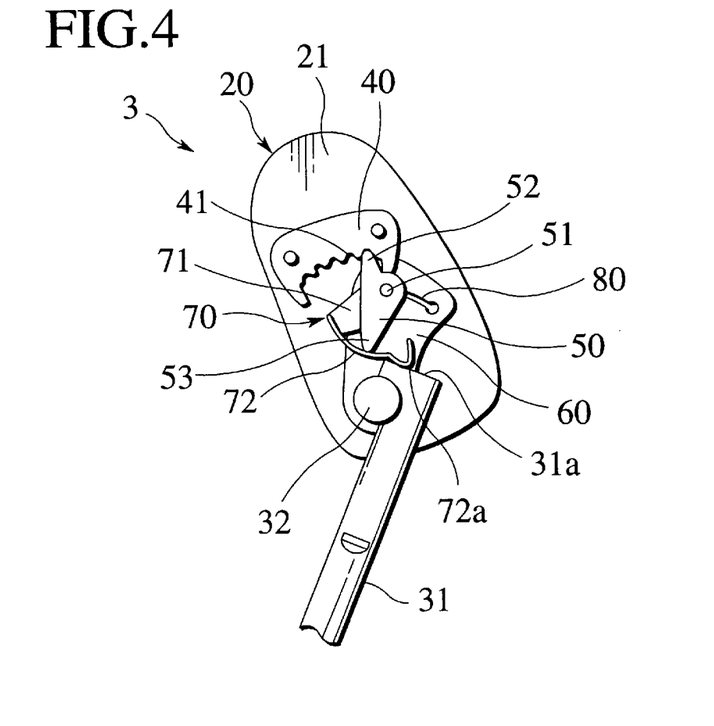
FIG. 4 is a side sectional view of the headrest in a service state where the main body is inclined to the foremost position.

As shown in FIG. 3, when the main body 3 is inclined forward (direction of the arrow 100) from the state shown in FIG. 2, the lower end portion 53 of the ratchet plate 50 moves a little backward, and the pawl portion 52 gets over the foremost crest and is engageable with the next groove. At the same time that the pawl portion 52 is engageable with the groove, the lower end portion 53 moves a little forward. By the resistance force produced when the pawl portion 52 gets over the crest, the engagement state between the pawl portion 52 and the groove is confirmed. When the main body 3 is inclined further forward, the pawl portion 52 is sequentially brought into engagement with the grooves, and as shown in FIG. 4, the main body 3 reaches the service state of being inclined to the foremost position. In the state of FIG. 4, the pawl portion 52 is engageable with the rearmost groove of the lock teeth 41.

Figure 5:
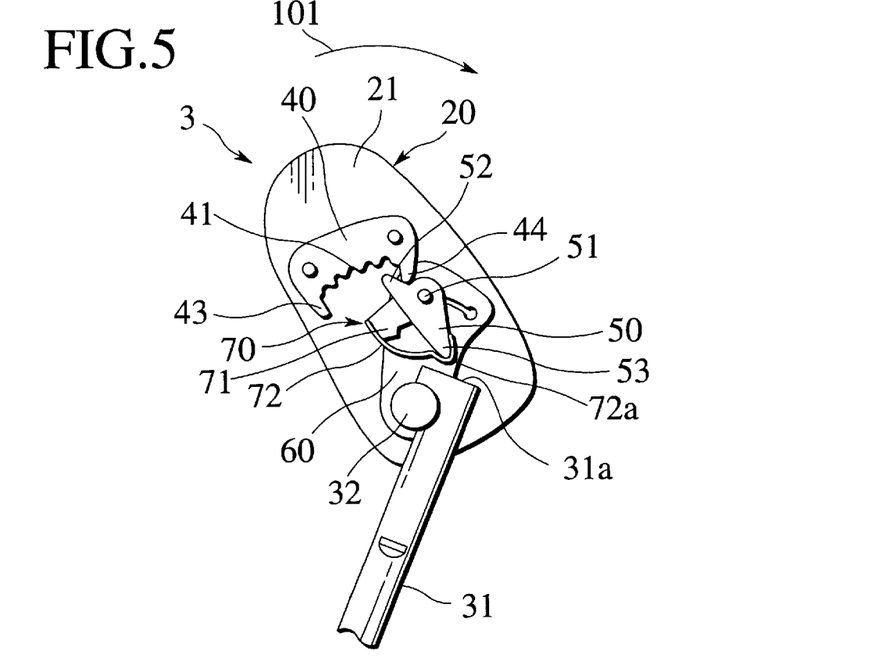
FIG. 5 is a side sectional view of the headrest in a lock off state where the main body is inclined further forward from the state of FIG. 4.

When the main body 3 is inclined further forward from the state shown in FIG. 4, it comes to be in the lock off state shown in FIG. 5, and the lower end portion 53 of the ratchet plate 50 moves backward and is inserted into the tip portion 72a of the plate spring 72, and the pawl portion 52 is completely separated downward from the lock teeth 41. In the lock off state, a further movement in the backward direction of the lower end portion 53 of the ratchet plate 50 is prevented by the tip portion 72a of the plate spring 72. Furthermore, the inclination further in the forward direction of the main body 3 is prevented by the contact of the pawl portion 52 with the rear end projection 44 of the lock member 40.

Figure 6:
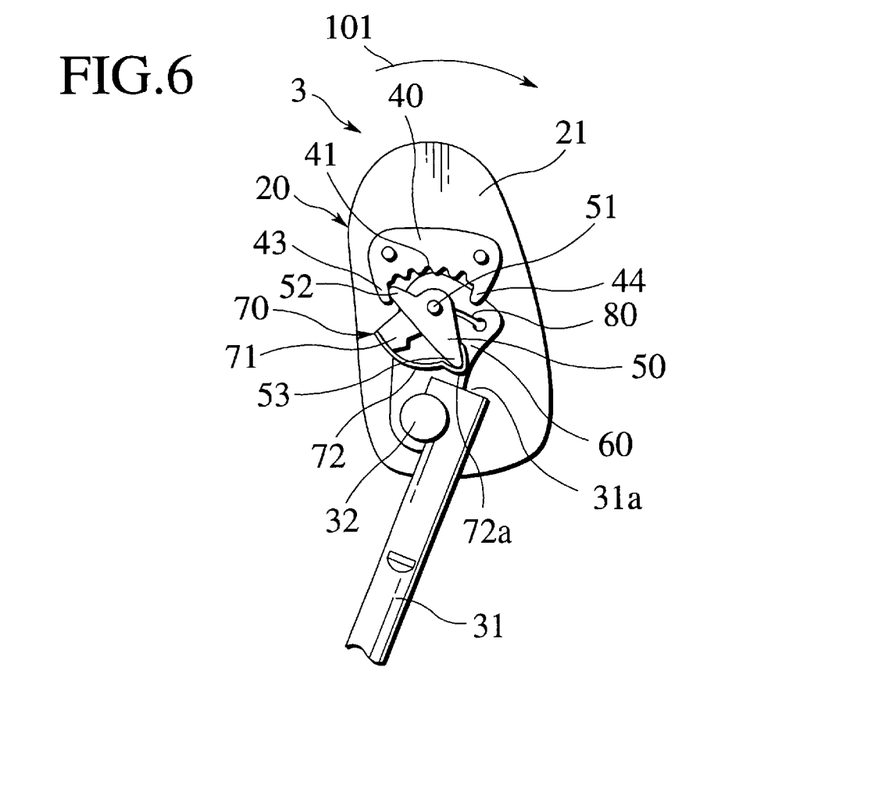
FIG. 6 is a side sectional view of the headrest in a state where the main body is inclined to the rearmost position from the state of FIG. 5.

When the main body 3 is inclined backward (direction of the arrow 101) from the state shown in FIG. 5, as shown in FIG. 6, the lock member 40 moves backward without movement of the ratchet plate 50 does not change, and the front end projection 43 of the lock member 40 contacts with the pawl portion 52 of the ratchet plate 50. When the main body is inclined further backward, the pawl portion 52 is pressed backward to move by the front end projection 43, and the lower end portion 53 of the ratchet plate 50 is separated from the tip portion 72a of the plate spring 72 to move forward, and the pawl portion 52 is brought into contact with the foremost groove of the lock teeth 41 to return to the state of FIG. 1.

Thus, the main body 3 can be set to a desired tilt angle through the ratchet mechanism 4 which is excellent in reliability and operability of a lock.

Figure 7:
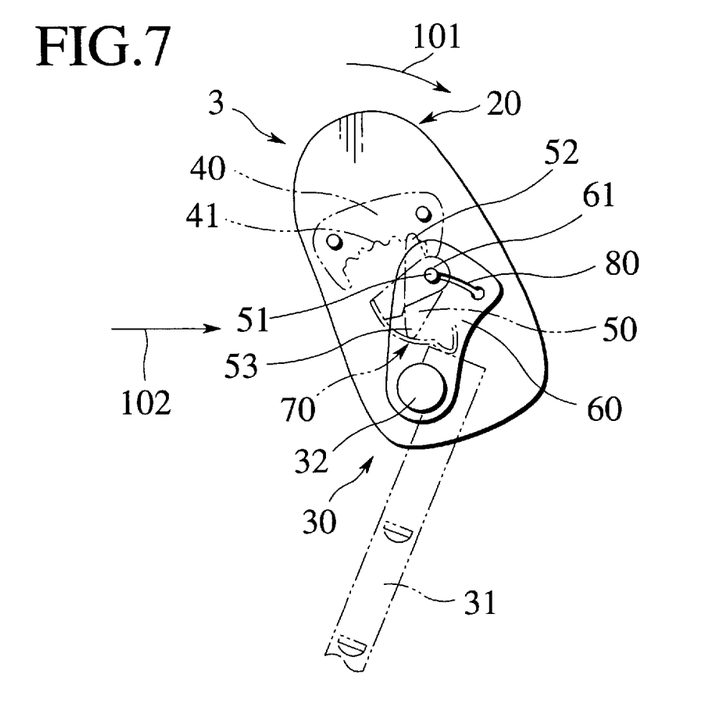
FIG. 7 is a side sectional view showing the headrest in a service state where the main body is inclined to the rearmost position with a section different from that of FIG. 4.
Figure 8:
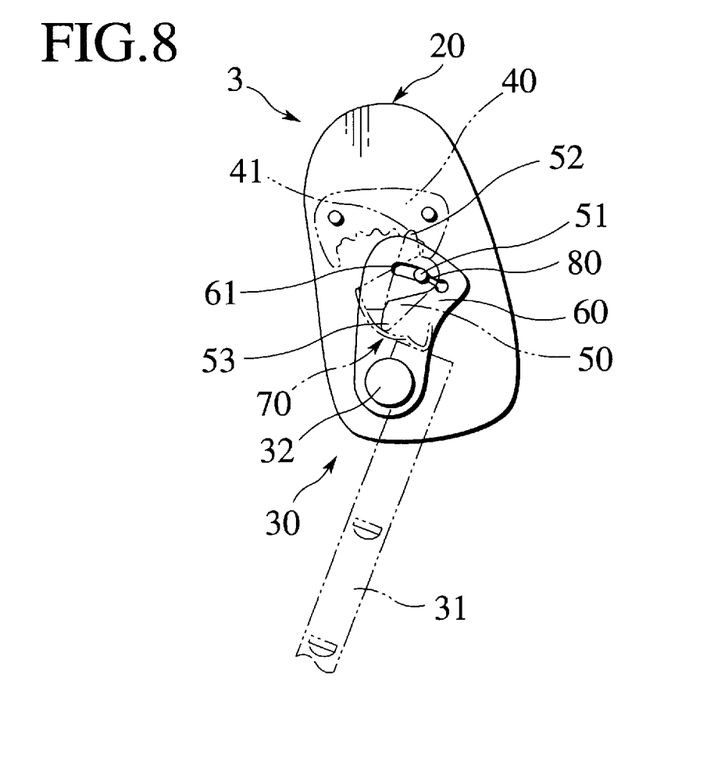
FIG. 8 is a side sectional view of the headrest of FIG. 7 in an initial state after receiving an impact.
Figure 9:
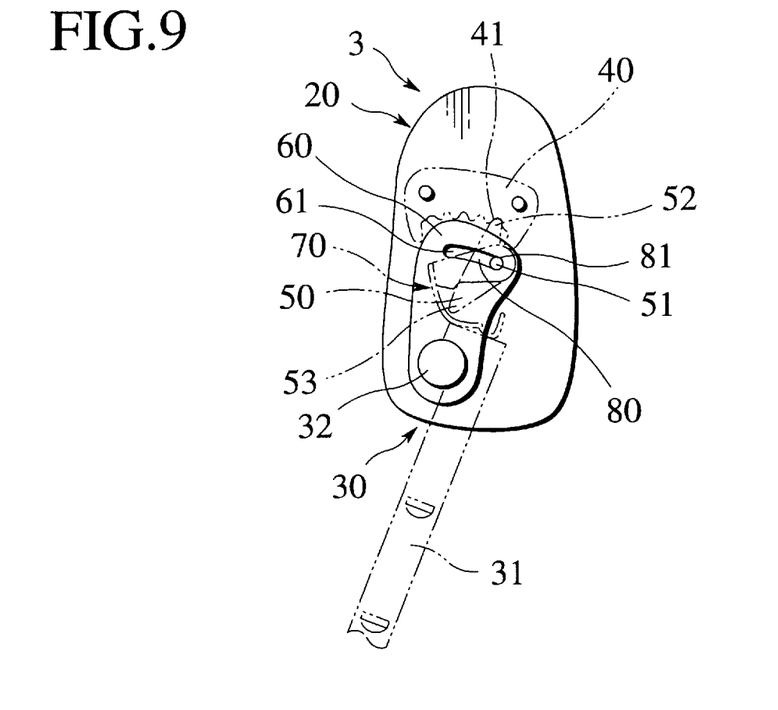
FIG. 9 is a side sectional view of the headrest of FIG. 7 in a state where the impact has completely been absorbed.

When a collision of a vehicle or the like arises, the head portion of the occupant on the seat 1 is instantly intensely pressed backward. At this moment, the main body 3 (frame 20) supports the head portion from the rear, so that the frame 20 may intensely be pressed backward by the head portion. As shown in FIG. 7, when the frame 20 is intensely pressed backward (direction of the arrow 102 in the figure), the support pin 51 is intensely pressed toward the slit 80 while the engagement between the pawl portion 52 and the lock teeth 41 is kept. Therefore, as shown in FIGS. 8 and 9, the support pin 51 moves in the slit 80 while widening the width of the slit 80 with pressure, and it reaches the rear end 81 of the slit 80. The rear end 81 of the slit 80 is shaped approximately like a circular hole, so that the stress concentration may be buffered. Therefore, the support pin 51 surely stops at the rear end 81 of the slit 80.

Accordingly, the main body 3 is inclined backward (direction of the arrow 101 in the figure) around the horizontal support portion 32 to move. At this moment, the plastic deformation of the slit 80 accompanied with the movement of the support pin 51 effectively absorbs the impact on the head portion. Furthermore, the main body 3 moves backward, so that the repulsion added to the head portion from the main body 3 may be decreased. Therefore, the impact on the head portion of the occupant is well buffered.

As mentioned above, the slit 80 is provided, which has a width smaller than the outside diameter of the support pin 51 and extends backward from the receiving hole 61, and therefore, the impact on the head portion can effectively and sufficiently be buffered without injuring the degree of freedom of the design of the main body.

Furthermore, the absorbing action of the impact energy is controlled by the shape (width and length) of the slit 80. Accordingly, by changing the shape of the slit 80, the absorbing action of the impact energy can finely be set, according to the requirement.

Figure 10:
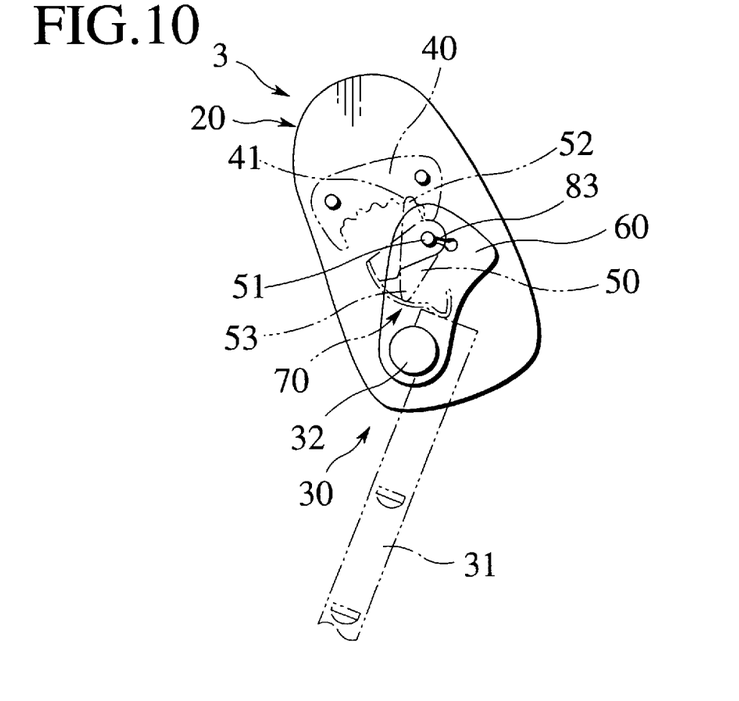
FIG. 10 is a side sectional view of a headrest of a second embodiment of the present invention.
Figure 11:
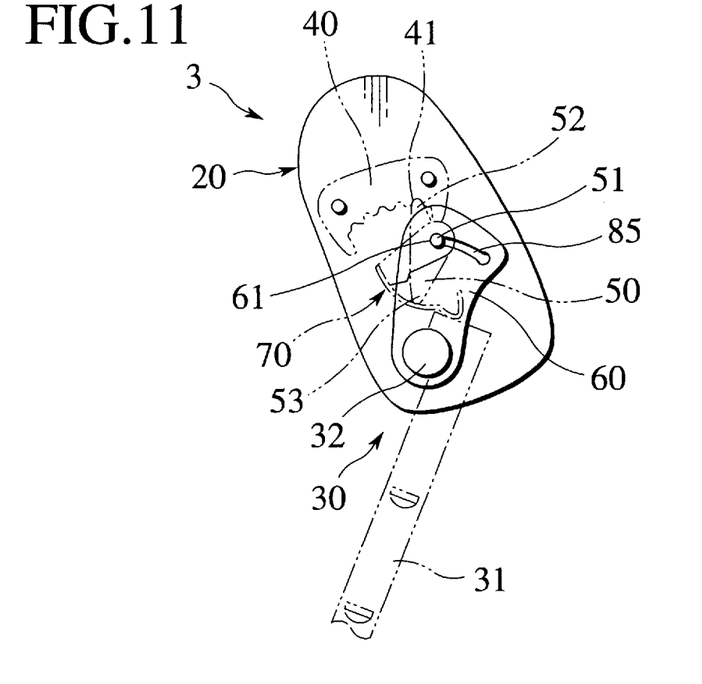
FIG. 11 is a side sectional view of a headrest of a third embodiment of the present invention.
Figure 12:
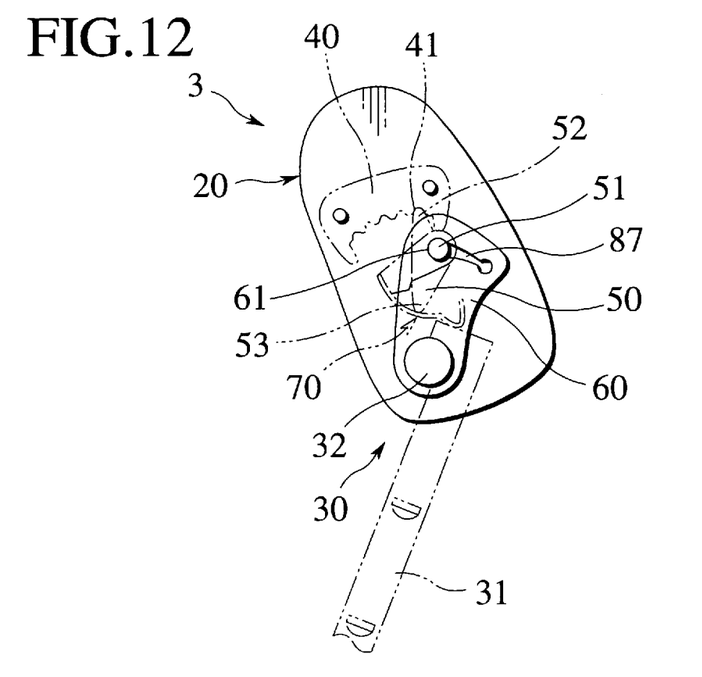
FIG. 12 is a side sectional view of a headrest of a fourth embodiment of the present invention.

FIGS. 10, 11, and 12 respectively show second, third, and fourth embodiment of the present invention. The second, third, and fourth embodiment are directed to modifications of the shape of the slit 80 of the first embodiment. Therefore, the same reference numerals are given to the component parts common to those of the first embodiment, and the description thereof will be omitted.

As shown in FIG. 10, a slit 83 of the second embodiment is formed to be shorter than the slit 80 of the first embodiment. Therefore, the amount of movement of the main body 3 is made to be less than that of the first embodiment, so that the falling of the head portion of the occupant in the backward direction can be minimized. In this case, the width of the slit 83 is preferably be smaller than that of the first embodiment.

As shown in FIG. 11, a slit 85 of the third embodiment is formed to be wider and longer than the slit 80 of the first embodiment. Therefore, the amount of movement of the main body 3 is large, so that the impact energy can more properly be buffered.

As shown in FIG. 12, a slit 86 of the fourth embodiment has a width which is gradually decreased in the backward direction.

When a collision of a vehicle or the like arises, the impact force added to the main body 3 from the head portion of the occupant sharply rises. The slit 86 has a width which is gradually decreased in the backward direction, so that the amount of movement of the main body 3 per unit time may be maximum at an initial time of the impact and then it may gradually be decreased. Such a movement of the main body 3 is especially preferable for buffering the impact on the head portion. Accordingly, as for buffering the impact energy, the slit 83 of the present embodiment is especially proper.

What is claimed is:

1. An adjustable headrest comprising:

a stay member extending upward from a seat back of a vehicle seat;

a main body for supporting a head portion of an occupant on the seat from rear, the main body including a frame rotatably connected to the stay member;

a ratchet mechanism arranged in the main body, the ratchet mechanism including a base plate fixed to the frame, a ratchet plate with a pawl portion, a support pin connecting the ratchet plate with the base plate, and a lock member fixed to the frame, the base plate having a receiving hole into which the support pin is inserted, the lock member having lock teeth engageable with the pawl portion in different positions, an inclination of the main body relative to the stay member changed according to the position of an engagement between the pawl portion and the lock teeth, the engagement between the pawl portion and the lock teeth preventing the main body from inclining backward relative to the stay member; and an impact absorbing slit formed in the base plate, the slit having a width smaller than an outside diameter of the support pin and extending backward from the receiving hole, wherein when the head portion receives an impact in a backward direction and the main body is intensely pressed backward, the support pin moves in the slit while widening the width with pressure and the main body moves backward so that deformation of the slit accompanied with movement of the support pin absorbs the impact.

2. The adjustable headrest according to claim 1, wherein absorbing action of the impact is controlled by a shape of the slit.

3. The adjustable headrest according to claim 2, wherein absorbing action of the impact is controlled by a length of the slit.

4. The adjustable headrest according to claim 2, wherein absorbing action of the impact is controlled by a width of the slit.

5. The adjustable headrest according to claim 4, wherein the width of the slit is gradually reduced in the backward direction.

6. The adjustable headrest according to claim 1, wherein an amount of movement of the main body in the backward direction is controlled by a length of the slit.

7. The adjustable headrest according to claim 1, wherein the ratchet mechanism further includes a spring member, the support pin rotatably connects the reinforcing plate and the ratchet plate, and the spring member biases the ratchet plate in a direction in which an engagement force of the pawl portion to the lock portion increases as the pawl portion is engaged with the lock teeth, so as to prevent rotation of the ratchet plate in a direction of allowing the main body to incline backward.

* * * * *